United States Patent [19]

Huitema

[11] Patent Number: 6,016,512
[45] Date of Patent: Jan. 18, 2000

[54] ENHANCED DOMAIN NAME SERVICE USING A MOST FREQUENTLY USED DOMAIN NAMES TABLE AND A VALIDITY CODE TABLE

[75] Inventor: Christian Huitema, New York, N.Y.

[73] Assignee: Telcordia Technologies, Inc., Morristown, N.J.

[21] Appl. No.: 09/135,619

[22] Filed: Aug. 18, 1998

Related U.S. Application Data

[60] Provisional application No. 60/066,227, Nov. 20, 1997.

[51] Int. Cl.[7] .............................. G06F 13/00; G06F 17/30; H04L 12/26
[52] U.S. Cl. ......................... 709/245; 709/227; 709/249; 709/203; 707/100
[58] Field of Search ........................... 395/200.75, 200.3, 395/200.33, 200.35, 200.36, 200.48, 200.49, 200.52, 200.55, 200.58, 200.61, 185.1, 683; 709/245, 201, 203, 206, 218, 219, 227, 249; 707/100, 1, 9, 10

[56] References Cited

U.S. PATENT DOCUMENTS

| | | |
|---|---|---|
| 5,227,778 | 7/1993 | Vacon et al. .................... 340/825.52 |
| 5,434,914 | 7/1995 | Fraser ................................ 379/219 |
| 5,664,185 | 9/1997 | Landfield et al. .................. 707/104 |
| 5,777,989 | 7/1998 | McGarvey ......................... 709/249 |
| 5,815,664 | 9/1998 | Asano ............................... 709/227 |
| 5,864,854 | 1/1999 | Boyle ................................ 707/10 |

OTHER PUBLICATIONS http://www.dns.be/rfc/rfc1035.html Feb. 13, 1996.
http://www.cs.unc.edu/Courses/wwwc/public/ladd/search.html Feb. 14, 1995.
http://www.webcrawler.com/mak/projects/robots/faq.html Feb. 10, 1996.
Knuth, The art of computer programming, Addison–Wesley Publishing Inc., Sub–chapter 6.4 1969/81.

Primary Examiner—Dung C. Dinh
Assistant Examiner—Quoc-Khanh Le
Attorney, Agent, or Firm—Joseph Giordano

[57] ABSTRACT

A system prefetches most frequently used domain names and stores the domain name data at local cache servers. It generates validity codes to enable error checking for valid domain names at the local cache servers without accessing root servers. A cache server obtains, stores, and propagates updates or new DNS data to local cache servers at predetermined intervals. Users can obtain internet protocol addresses of domain names directly from local cache servers, thus eliminating processing delays over the Internet.

10 Claims, 6 Drawing Sheets

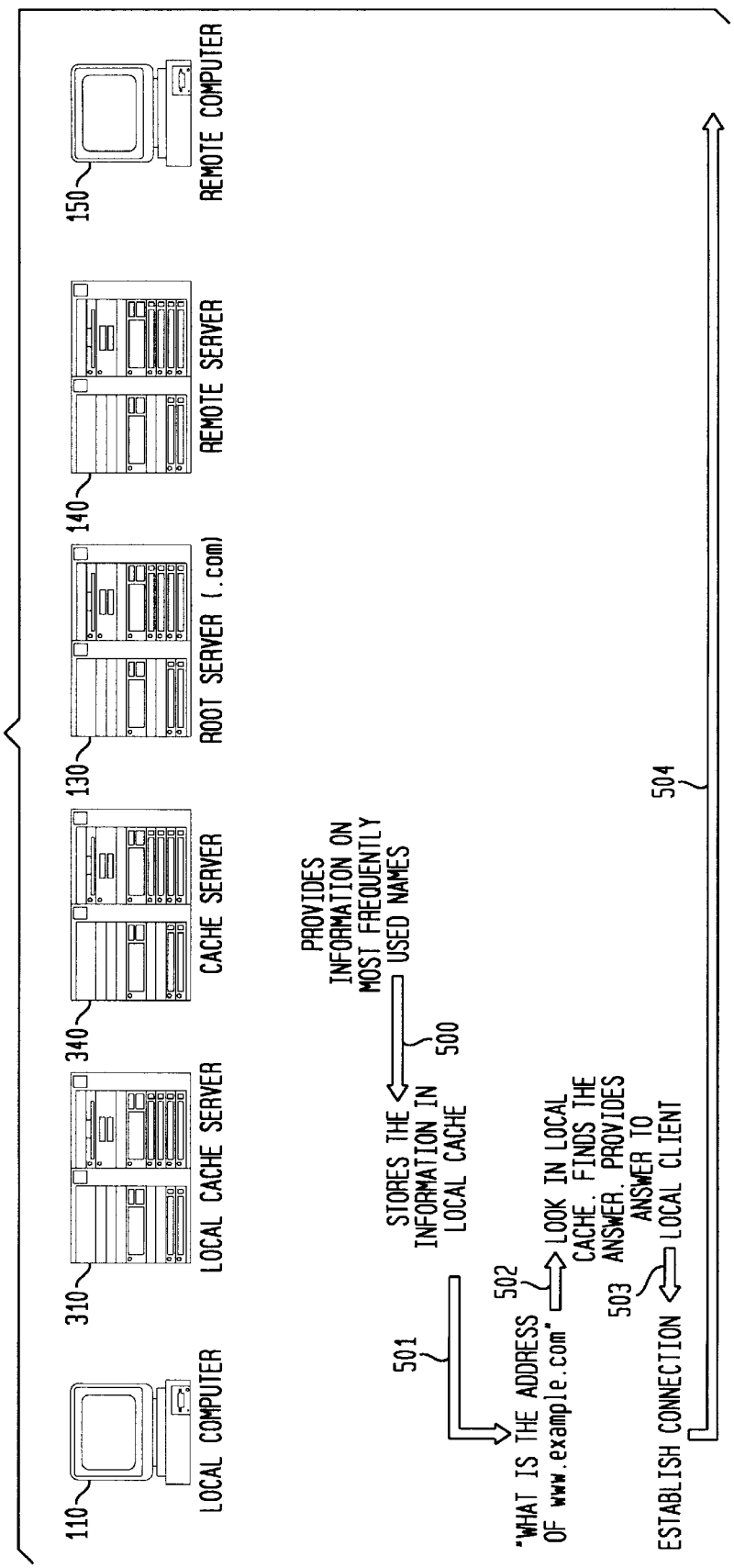

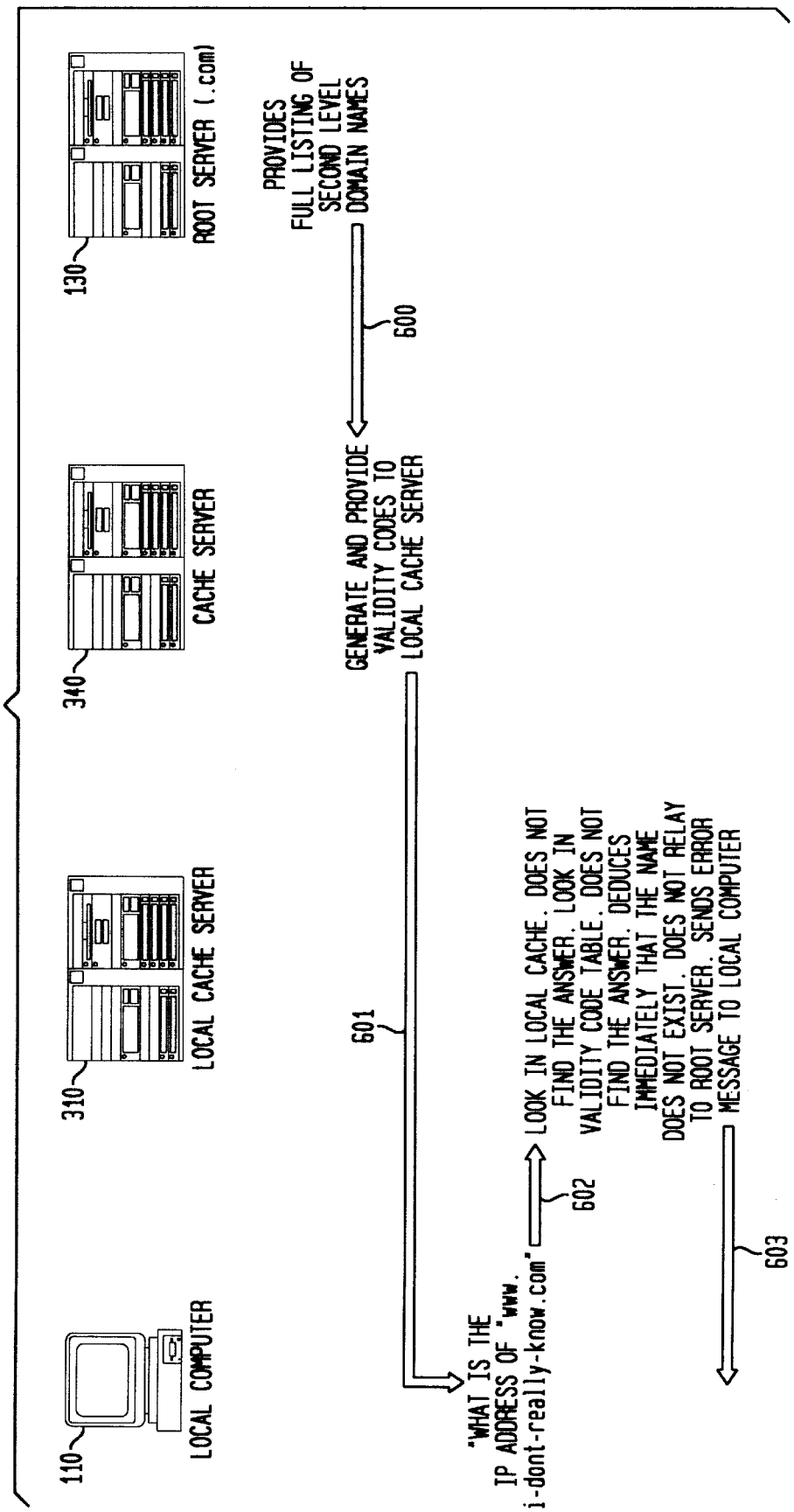

ENHANCED DOMAIN NAME SERVICE USING A MOST FREQUENTLY USED DOMAIN NAMES TABLE AND A VALIDITY CODE TABLE

RELATED APPLICATIONS

This application is based on and claims the priority of provisional application Ser. No. 60/066,227 filed on Nov. 20, 1997, the contents of which are hereby incorporated by reference.

BACKGROUND ART

The present invention relates generally to enhanced domain name servers (DNS), and more particularly, to efficiently processing domain name (DN) queries in a network.

The Internet has experienced explosive growth in recent years and provides a vast resource of information on a wide array of topics. The Internet requires DNS for providing Internet Protocol (IP) addresses corresponding to the DNs. The response time of any DNS query, however, is highly dependent on the latency of the Internet. In addition, the availability of any response varies with the packet loss rate of the Internet. DNS developers attempted to address these problems by including a cache memory in local servers. FIG. 1 is a state diagram showing a process flow of traditional DNS processing.

To access a remote computer over the Internet, a user types in the DN or URL (Universal Resource Locator) of that remote computer (e.g., www.example.com) using a browser at a local computer 110 (step 160). Most Internet connections begin by a query to a local server 120 to obtain the IP address of that computer (e.g., 128.96.41.1). To do so, local server 120 looks in its local cache storing previous queries. If the current query is for an IP address that matches a previous query, local server 120 can respond to the query immediately using the information stored in the local cache.

If local server 120 does not find the answer in the local cache, however, local server 120 relays the query to a root server 130 (step 161). Root server 130, or more precisely the "top level domain server," knows the address of all "remote servers" that manage second level names (e.g., example.com). Root server 130 transmits redirection information, i.e., name and IP address of the remote server (e.g., dns.example.com) to local server 120 (step 162). Thereafter, local server 120 repeats the query, this time to the specified remote server 140 (e.g., dns.example.com) (step 163). Remote server 140 in turn, transmits the IP address of the requested DN to local server 120 (step 164). Local server 120 stores a copy of this answer in its local cache and provides an answer to local computer 110 (step 165). Using the IP address, local computer 110 establishes connection with remote computer 150 (step 166).

Subsequently, if local computer 110 repeats the same query (step 167), local server 120 looks in the local cache and will find the IP address. Local server 120 then transmits the address to local computer 110 without having to access other components of the network (step 168), thus enabling local computer 110 to establish connection to remote computer 150 (step 169).

Referring to FIG. 2, a special case occurs when a user mistypes or guesses the DN, making up such names as "www.i-dont-really-know.com" (step 200). Similar to the above-explained process flow, local server 120 checks its local cache. But since local server 120 will not find the DN in the local cache, it relays the query to root server 130 (step 201). Thereafter, root server 130 checks a reference database to determine whether the DN exits and returns an error message to local server 120 (step 202). Local server 120, in turn, relays the error message to local computer 110 (step 203).

Some local servers keep a copy of these error messages, but typically only for a short period of time since a name that is not found one day may well be registered the next. Moreover, copies of error messages are only useful if users keep repeating the exact same mistake, an unlikely event. In practice, most wrong guesses result in a transaction to one of the root servers, thus extending the DN processing time and subjecting communications to problems with Internet traffic.

Moreover, due to the dramatic increase in the size of the Internet since the late 1980's, the caching technique no longer provides high quality results. Typically, fewer than 85% of queries are served in less than three seconds. This is expected to worsen as the Internet grows.

Therefore, it is desirable to increase the efficiency in processing DN queries for connecting local computers to remote computers.

It is also desirable to provide efficient processing of invalid DNs.

DISCLOSURE OF THE INVENTION

Accordingly, the present invention is directed to an enhanced DN service that substantially obviates one or more of the problems due to limitations and disadvantages of the related art.

Specifically, a method consistent with the present invention for processing DN requests comprises the following steps. Initially, the system prefetches most frequently used (MFU) domain names and associated domain addresses. It then transmits to a local server the prefetched MFU DNs and the associated domain addresses, wherein the local server uses the prefetched MFU DNs and the associated domain addresses to process DN requests.

A system consistent with the present invention for processing DN requests comprises prefetching means and transmitting means. Initially, the prefetching means prefetches MFU DNs and associated domain addresses. The transmitting means then transmits to a local server the prefetched MFU DNs and the associated domain addresses, wherein the local server uses the prefetched MFU DNs and the associated domain addresses to process DN requests.

BRIEF DESCRIPTION OF THE DRAWINGS

The accompanying drawings, which are incorporated in and constitute a part of this specification, illustrate the invention and together with the description, serve to explain the principles of the invention.

In the drawings,

FIG. 5 is a state diagram showing a process flow of DNS processing consistent with one embodiment of the present invention; and FIG. 6 is a state diagram showing a process flow of DNS processing of an invalid DN consistent with one embodiment of the present invention.

BEST MODE FOR CARRYING OUT THE INVENTION

Figure 1:
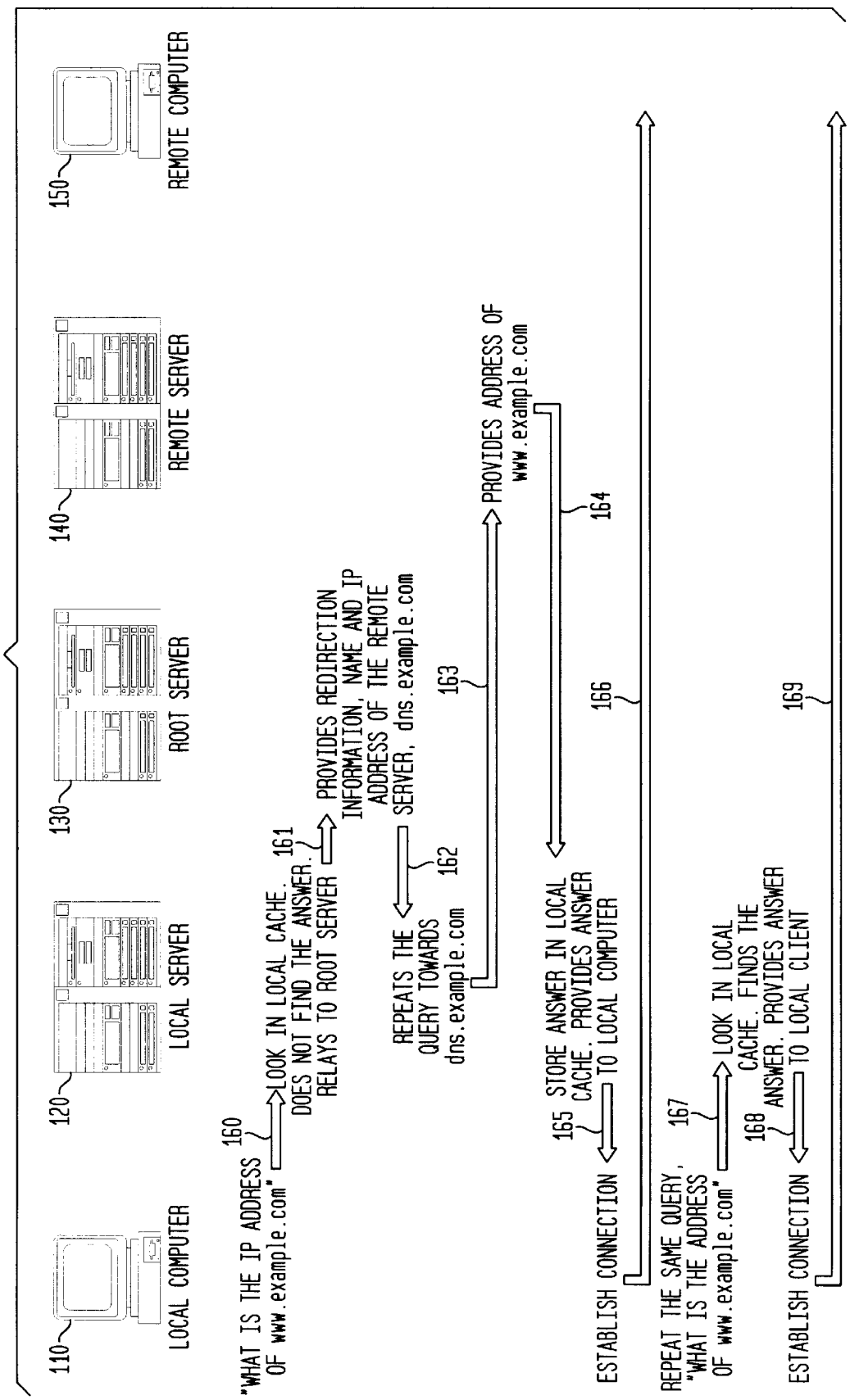
FIG. 1 is a state diagram showing a process flow of traditional DNS processing of a DN request.
Figure 2:
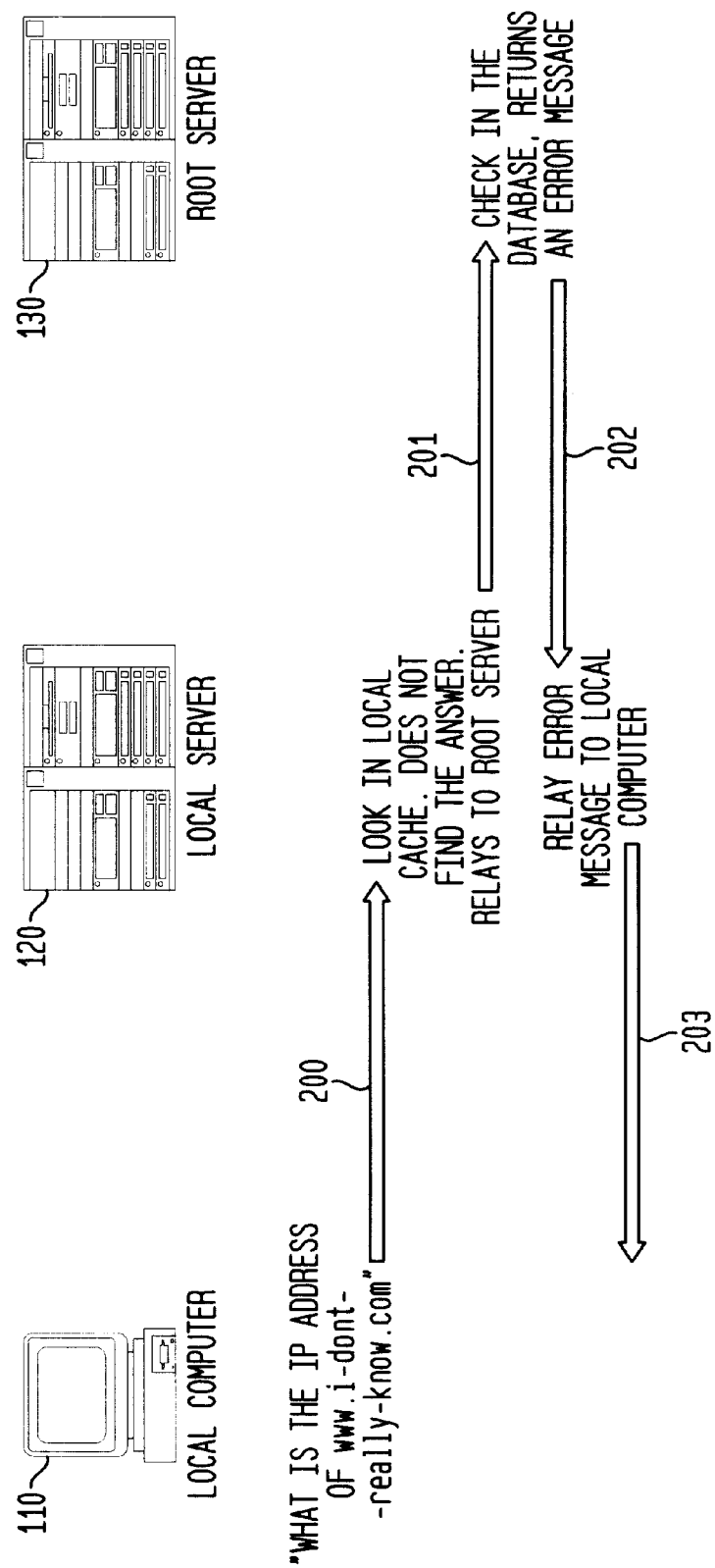
FIG. 2 is a state diagram showing a process flow of traditional DNS processing of a DN request for an invalid DN.

Reference will now be made in detail to the present preferred embodiment of the invention, an example of which is illustrated in the accompanying drawings. Where appropriate, the same reference numerals refer to the same or similar elements. The appended claims define the scope of the invention; the following description does not limit that scope.

Figure 3:
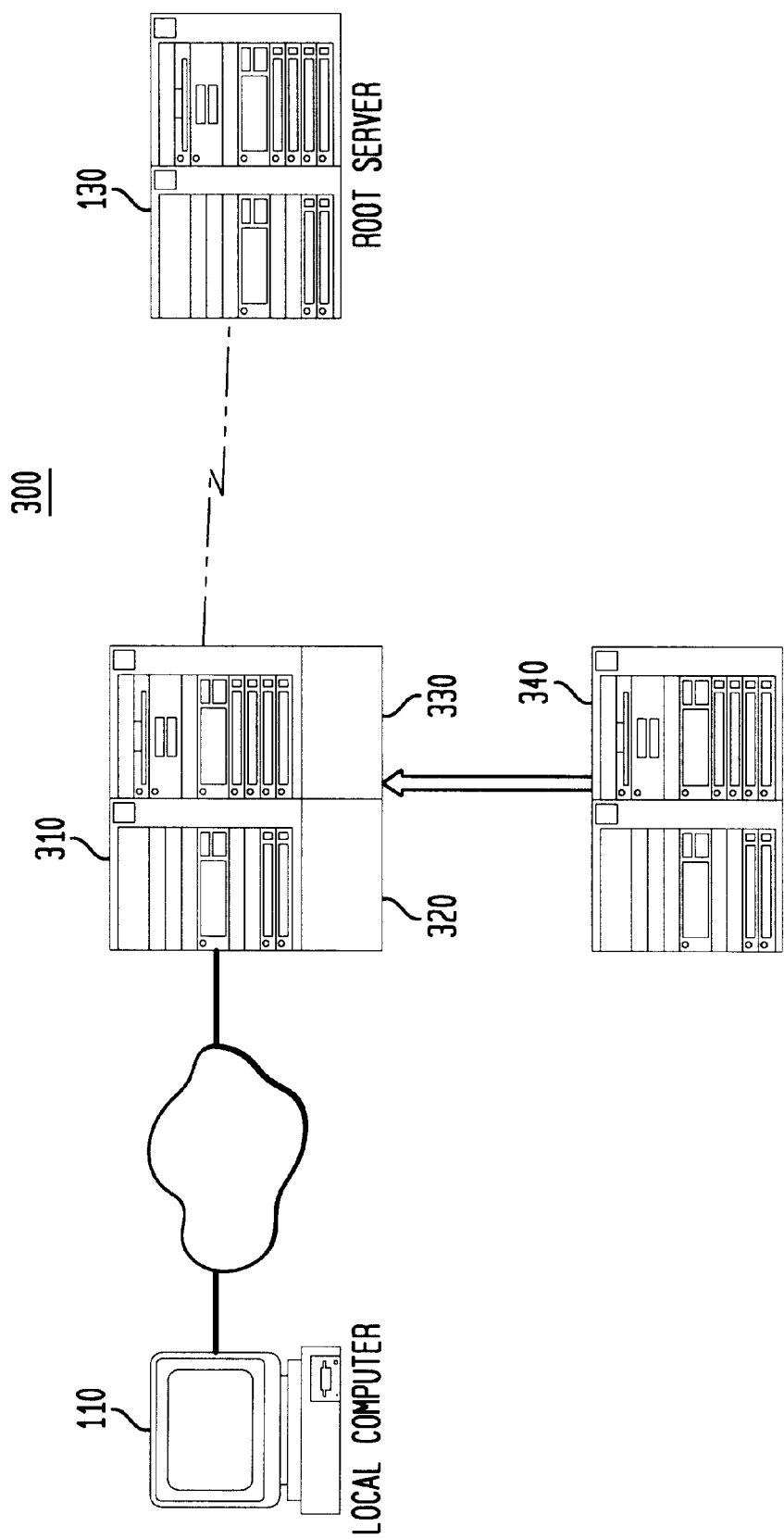
FIG. 3 is a diagram showing an example of a network consistent with one embodiment of the present invention.

FIG. 3 shows an example of a network environment consistent with one embodiment of the present invention. In network 300, local computer 110 is coupled to a local cache server 310 over network connections. Local cache server 310 also connects to a cache server 340 and root server 130. Local cache server 310 includes a most frequently used domain names (MFU DNs) table 320 and a validity code table 330. Local cache server 310 preferably is a high-end network server having capacity to hold a few million records in its database and high-speed network access.

Figure 4:
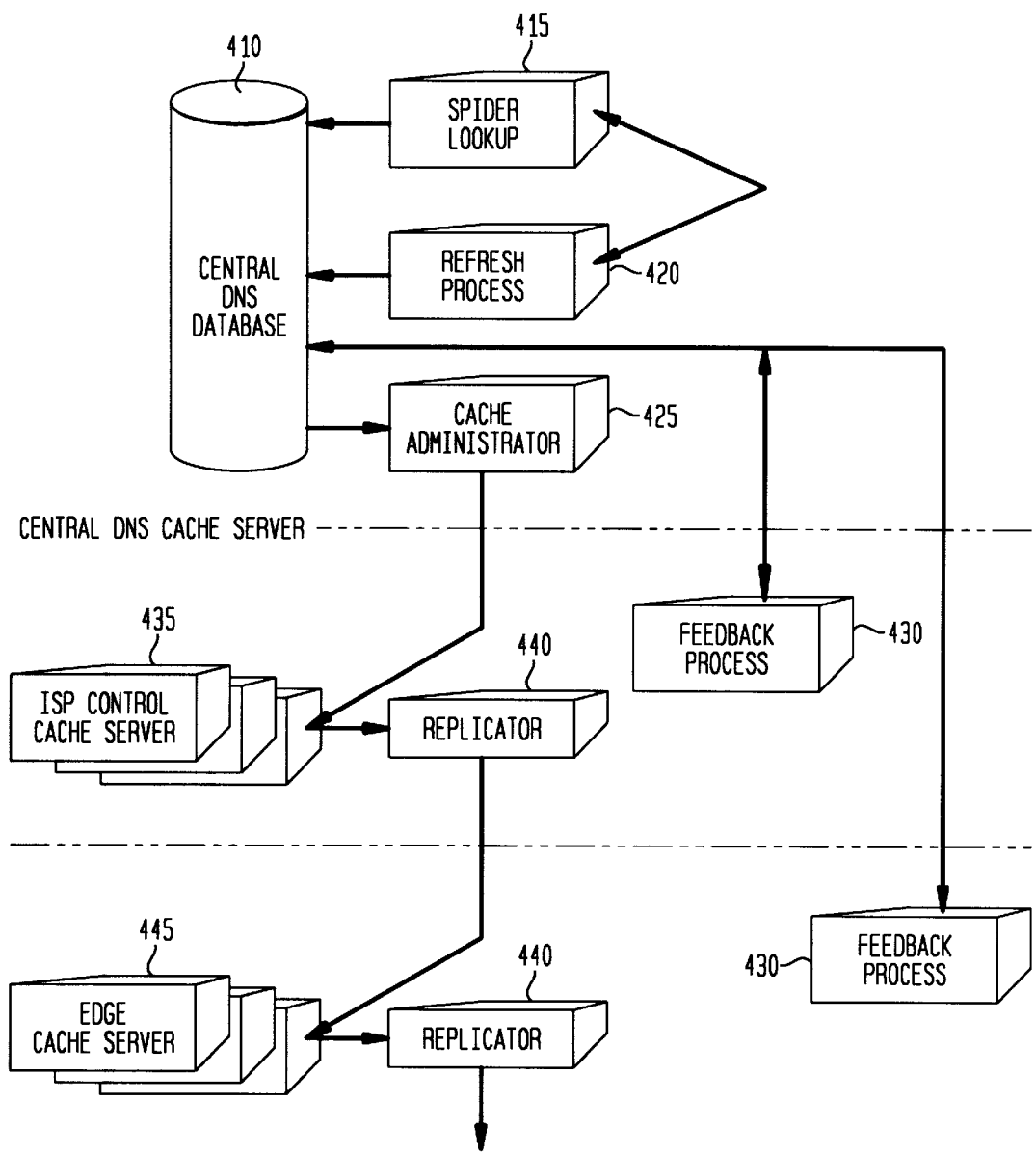
FIG. 4 is a functional block diagram showing service elements of the network consistent with one embodiment of the present invention.

FIG. 4 is a functional block diagram showing service elements of network 300 consistent with one embodiment of the present invention. A central DNS cache server includes a central DNS database 410, a spider lookup 415, a refresh process 420, a cache administrator 425, a feedback process 430, ISP control cache servers 435, replicators 440, and edge cache servers 445. In one embodiment consistent with the present invention, the central DNS cache server can be operated by a commercial service, which would send updates to ISP control cache servers 435, typically operated by Internet Service Providers (ISPs). ISP control cache server 435, in turn, replicates the cache updates to edge cache servers 445. The updates are preferably sent over TCP-IP connections. ISP control cache servers 435 or edge cache servers 445 of FIG. 4 are examples of local cache server 310 in FIG. 3.

According to the present invention, local cache servers 310, located near local computers 110, contain a large portion of the DNS data. Thus, in most cases, requests from local computers 110 will be serviced directly by local cache servers 310. The DNS data contained in local cache servers 310 are not collected by the local cache servers 310 themselves, as in the prior art systems, but rather are provided by network cache servers 340. Specifically, network cache servers 340 update local cache servers 310 on a predetermined basis by providing DNS records consisting preferably of three data sets. The type and scope of data included in the MFU DNs may vary, however.

The first data set is a list of the most active names together with the corresponding name and address records, i.e., DNS records of type NS (DNS record containing DNS names of the DNS servers that hold information about the specified domain) and type A (DNS record containing the IP address of a computer identified by a DNS name). For each DNS record, central DNS database 410 stores the name (name of the node to which the resource record pertains), type and class of the record, time to live (TTL) variable, length (specifying the length of the data field), and data (field describing the resource). TTL is the estimated life expectancy during which the DNS record remains current. The TTL can be set and reset to a certain predetermined value including periodic or discrete preset times.

The second data set is a complete listing of the existing names at the root level and, preferably, also second level DNs of the most frequently accessed domain, e.g., ".com." A listing of second level domains is a flat file of names such as "bellcore.com." These names have two components, the second level domain name and the name of the "top level domain." This data set contains a full listing of all names that are registered in a monitored top level domain. The present invention generates validity codes using a standard technique, e.g., a hash coding (explained below), and produces for each DN a hash code, which is preferably an integer number. A complete list of hash codes or validity codes, but not the list of names, is transmitted to local cache servers 310 for use in error checking as will be explained below.

The third data set is a listing of the highest levels of the DNS inverse tree used by servers to locate the origin of Internet connections. The inverse tree contains names that are derived from IP addresses. For example, the address "192.4.18.101" can be used to build the inverse name "101.18.4.192.in-addr.arpa." These names are used by servers to retrieve the domain names of clients. Each level of the naming hierarchy may be handled by a different server. The first level is typically handled by a registry, the second level by an Internet Service Provider or by a large organization, and the third level by a retail ISP or by the manager of a local network, i.e., "edge cache servers." By caching DNS information at the first two levels, the queries can be directed immediately to the remote server that can transform the inverse name into the actual name of the machine that uses the IP address, in the present example, "seawind.bellcore-.com."

Web lookup 415 employs web spiders, which are software processes that visit web sites and automatically explore their contents, to obtain MFU DNs. From the web content, web spiders extract names of other sites, which the web spiders can visit next, thus, exploring a large part of the Internet. Web spiders are typically used to build large index databases for index servers such as Yahoo, Altavista, and Excite. One embodiment consistent with the present invention employs web spiders to discover new web sites. Web spiders only obtain an approximation of the MFU DNs because they collect most frequently accessed references, which is a different property from MFU DNs. The collection of MFU DNs obtained by web spiders is supplemented by feedback process 430. Feedback process of ISP control cache servers 435 and edge local cache servers 445 collect statistics of the MFU DNs and send this data to central DNS database 410.

Refresh process 420 queries central DNS database 410 at intervals corresponding to TTL to determine whether the information in central DNS database 410 has changed to ensure that local cache server 310 always contains up-to-date information. In one embodiment consistent with the present invention, refresh process 420 need not conduct a full update. In many cases, TTL may be set to a relatively short value, such as one day, because managers of the records might update the next day. DNS database 410, in such cases, may be refreshed every day. In one preferred embodiment of the present invention, TTL is set to a level so that the information would not be updated too frequently, which would effectively preclude caching.

There is no need to perform a full update unless the information actually changes. If the information does not change, cache administrator 425 only needs to send a message that essentially revalidates the current information. If refresh process 420 determines that the information actually changed, cache administrator 425 extracts the information from central DNS database 410 and selects only actual updates or new information to propagate to ISP control cache servers 435 and edge cache servers 445. For example, an update is necessary when a new DN is added to central DNS database 410 by spider lookup 415 or feedback process 430. Replicator 440 of ISP control cache server 435 replicates the updates or new information to the next level of cache servers, i.e., edge cache servers 445. Replicator 440 of edge cache servers 445, in turn, replicates the updates or new information to other cache servers.

Thus, referring to FIG. 5, according to one embodiment consistent with the present invention, cache server 340 transmits DNS data to local cache server 310 at predetermined intervals, or TTL (step 501). The data includes the three types of data sets explained above, and subsequent transmissions need only contain updates to the existing DNS data at local cache server 310. Local cache server 310 receives the DNS data or updates and updates MFU DNs table 320 (step 502). MFU DNs table 320, containing the three data sets, is preferably stored in cache for fast access.

When a user types in a user request, i.e., the DN or URL of a remote computer (e.g., www.example.com) using a browser at a local computer 110 (step 502), local cache server 310 accesses MFU DNs table 320. If local cache server 310 finds the answer, which will be the case in most instances, local cache server 310 transmits the corresponding IP address to local computer 110 (step 503). Using the IP address, local computer 110 establishes connection with remote computer 150 (step 504). Thus, local cache server 310 responds to queries directly, significantly reducing DNS processing time.

A different scenario occurs for DN requests of invalid names. In the present invention, cache server 340 generates validity codes of valid DN names to be stored in validity code table 330 of local cache server 310. In this manner, local cache server 310 checks its local cache to determine whether the requested DN is valid without having to access root server 130. Since the memory capacity of local cache at local cache server 310 is limited, in one embodiment consistent with the present invention, local cache server 310 stores the validity codes of all top level domains as well as second level DNs of the most frequently accessed domain, e.g., ".com."

Accordingly, referring to FIG. 6, root server 130 of ".com" provides a full listing of second level DNs to cache server 340 (step 600). Cache server 340 preferably generates validity codes of the top level domains and ".com" using hash coding. Cache server 340 transmits the validity codes to local cache server 310 (step 601). Although there are many ways to implement the hash coding, the following Java method provides one example:

```
int hash (String domainName)
{
    int x, r, l;
    char c;
    x = 0
    for (I = 0; i < domainName.length(); I++){
        r = (x >> 24)&255;
        x <<= 8;
        x |= r;
        x ^= (r >> 1);
        c = domainName.charAt(l);
```

```
        if (c == '.')
            x ^= 37;
        else if (c == '-')
            x ^= 36;
        else
            x ^= ((Character.digit(c, 36))&255);
    }
    return(x);
}
```

This algorithm returns a 32 bit integer, whose value is a function of the domain name:

| Domain name | Hash code |
| --- | --- |
| bellcore.com | 370308165 |
| inria.fr | 1008476717 |
| nsa | 622275647 |
| nsa.gov | 623459329 |

Other hash coding techniques may be implemented to generate codes requiring much less memory than the full DNs to reduce the memory requirement of local cache server 310. The same technique should be used consistently, however, within a single network platform by various components, e.g., local cache server 310, cache server 340, and cache administrator 425. Additionally, the technique implemented should preferably be programmed to return results that only depend on the DNs and not the supporting platform.

Accordingly, when a user types in the DN or URL of a remote computer (e.g., www.i-dont-really-know.com) using a browser at a local computer 110 (step 602), local cache server 310 accesses MFU DNs table 320. If local cache server 310 does not find the answer, rather than relaying the query to root server 130, local cache server 310 generates a check code of the DN in the query using hash coding or other technique implemented in network 300. If the generated check code is not in validity code table 330, local cache server 310 transmits an error message to local computer 110 (step 603). Thus, local cache server 310 reduces processing time for queries for invalid DNs by eliminating the need to access root server 130. In the rare instance when the DN is not in the MFU DNs table 320 and the check code matches one of the entries in validity code table 330, local cache server 310 processes the DN query in the traditional manner.

Systems and methods consistent with the present invention improve the efficiency of DN processing by storing MFU DNs and validity codes at local cache servers. Such systems and methods process DN queries without accessing remote servers or root servers, thus, significantly reducing processing time. The central server is periodically updated with new and revised DN data and the central server propagates the updates to edge cache servers.

It will be apparent to those skilled in the art that various modifications and variations can be made in the systems and methods of the present invention without departing from the scope or spirit of the invention. For example, Internet has been used as an exemplary network setting. The teachings of the present application, however, may be easily adapted and applied in other network settings by one ordinary skilled in the art. Other embodiments of the invention will be apparent to those skilled in the art from consideration of the specification and practice of the invention disclosed herein. It is intended that the specification and examples be considered as exemplary only, with the true scope and spirit of the invention indicated by the following claims.

What is claimed is:

1. A method for reducing the number of erroneous domain requests forwarded to domain name server (DNS) root servers from a local computer, the local computer being connected to a local cache server storing a most frequently used domain names table with associated domain addresses and a validity code table and being connected to one or more remote root servers, the method comprising the steps of receiving a user request for a domain name, in response to said request, accessing the most frequently used domain names table in the local cache server, if the domain name is not in the most frequently used domain names table, generating a code check to access the validity code table in the local cache server, if the generated code check is not in the validity code table, returning an error message to the local computer, and if the generated code check is in the validity code table, forwarding the request to one of said remote root servers.

2. The method in accordance with claim 1 wherein the validity code table is a list of hash codes that completely represent the population of a domain.

3. The method in accordance with claim 2, further comprising the step of periodically updating the validity code table from a network cache server.

4. The method in accordance with claim 1, further comprising the step of periodically updating the local cache server from a network cache server, the network cache server providing the local cache server with a first data set comprising the most frequently used domain numbers and their associated domain addresses and a second data set comprising a complete listing of the existing domain names.

5. The method in accordance with claim 4 further comprising the network cache server providing the local cache server with a third data set comprising a listing of the highest levels of a domain name inverse tree.

6. A method for enhancing the efficiency of a local cache server associated with a local computer for processing with reduced processing time domain requests, said method comprising the steps of populating the local cache server with a first set of data comprising the most frequently used domain names table and populating the local cache server with a second set of data maintained by a network cache server, said second set of data comprising a validity codes table generated from a complete listing of existing domain names at the local cache server.

7. The method in accordance with claim 6 wherein the validity code table at the local cache server is a list of hash codes that completely represent the population of the domain.

8. A system for processing with reduced processing time domain requests at a local computer, said system comprising a local cache server connected to the local computer and storing a most frequently used domain names table with associated domain addresses and a validity code table, a plurality of remote root servers connected to the local computer, means for receiving a user request for a domain name, means for accessing the most frequently used domain names table in said local cache server in response to said user request, means for generating a code check to access the validity table in said local cache server if the domain name is not in the most frequently used domain table, means for returning an error message to the local computer if the generated code check is not in the validity code table, and means for forwarding the request to one of said remote root servers if the generated code check is in the validity code table.

9. The system in accordance with claim 8 further comprising a network cache server, means for updating said local cache server from said network cache server, said network cache server providing said local cache server with a first data set comprising the most frequently used domain numbers and their associated domain addresses, a second data set comprising a complete listing of the existing domain names, and a third data set comprising a listing of the highest levels of a domain name inverse tree.

10. An article of manufacture capable of configuring a local cache server connected to a local computer to process domain name requests, the local cache server storing a most frequently used domain names table with associated domain addresses and a validity code table, the article comprising program code to cause the local cache server to perform, the steps of receiving user request for a domain name, accessing the most frequently used domain names table in the local cache server in response to said request, generating a code check to access the validity code table in the local cache server if the domain name is not in the most frequently used domain names table, returning an error message to the local computer if the generated code check is not in the validity code table, and forwarding the request to a remote root server connected to the local computer if the generated code check is in the validity code table.

* * * * *